(12) United States Patent
Fan et al.

(10) Patent No.: US 7,633,750 B2
(45) Date of Patent: Dec. 15, 2009

(54) LOCKING DEVICE FOR DOCKING STATION

(75) Inventors: Chien-Ming Fan, Tu-Cheng (TW); Chang-Lin Yang, Tu-Cheng (TW); Chin-Chung Fu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 199 days.

(21) Appl. No.: 11/615,903

(22) Filed: Dec. 22, 2006

(65) Prior Publication Data

US 2007/0297130 A1 Dec. 27, 2007

(30) Foreign Application Priority Data

Jun. 23, 2006 (CN) .................. 2006 1 0061310

(51) Int. Cl.
*G06F 1/16* (2006.01)
*H05K 5/00* (2006.01)
*H05K 7/00* (2006.01)

(52) U.S. Cl. .................. 361/679.43; 361/679.41

(58) Field of Classification Search ............. 361/683, 361/686, 679.41, 679.43
See application file for complete search history.

(56) References Cited

U.S. PATENT DOCUMENTS

| | | | | |
|---|---|---|---|---|
| 5,182,698 A | | 1/1993 | Kobayashi et al. | |
| 5,580,182 A | * | 12/1996 | Lin | 403/325 |
| 5,619,398 A | * | 4/1997 | Harrison et al. | 361/686 |
| 5,784,253 A | * | 7/1998 | Ooka et al. | 361/686 |
| 6,061,234 A | * | 5/2000 | Broder et al. | 361/686 |
| 6,069,790 A | * | 5/2000 | Howell et al. | 361/686 |
| 6,189,349 B1 | * | 2/2001 | Helot et al. | 70/58 |
| 6,275,378 B1 | * | 8/2001 | Lee et al. | 361/686 |
| 6,560,101 B1 | * | 5/2003 | Oross et al. | 361/686 |
| 6,741,462 B2 | * | 5/2004 | Kamphuis et al. | 361/686 |
| 6,885,552 B2 | * | 4/2005 | Mullen et al. | 361/686 |
| 6,912,125 B2 | * | 6/2005 | Weng | 361/686 |
| 7,079,385 B1 | * | 7/2006 | Cheng et al. | 361/686 |
| 7,110,252 B2 | * | 9/2006 | Liang et al. | 361/686 |
| 7,381,079 B2 | * | 6/2008 | Chuang | 439/352 |

* cited by examiner

*Primary Examiner*—Jayprakash N Gandhi
*Assistant Examiner*—Quinn Hunter
(74) *Attorney, Agent, or Firm*—Frank R. Niranjan (57) ABSTRACT

A locking device includes a case defining at least one slot therein, a hook module including at least one hook for passing through the at least one slot, a linkage module includes at least one first lever configured for shifting the at least one hook to move between a locking position and a releasing position, and a positioning module for releasably engaging with the first lever. When the at least one hook is shifted to the releasing position, the first lever is blocked by the positioning module, when the at least one hook is shifted to the locking position, the first lever is released by the positioning module.

16 Claims, 12 Drawing Sheets

LOCKING DEVICE FOR DOCKING STATION

BACKGROUND OF THE INVENTION

1. Field of the Invention

The present invention relates to locking assemblies and, more particularly, to a locking device for a docking station.

2. Description of Related Art

Portable computers, such as notebook computers and personal digital assistants (PDAs), are popular and commonly used devices that provide users with mobile computing power in small, lightweight, portable packages. The portable computer usually offers less functions than a desktop computer because the portable computer may lack certain peripheral devices (e.g. a CD-ROM drive or a floppy drive).

A docking station has been developed to enhance and extend functions found in a desktop computer to a portable computer. The docking station typically provides a plurality of hooks engaging in a plurality of corresponding holes defined in the portable computer, thus, establishing a stable mechanical fixation between the portable computer and the docking station. Therefore, undesired divorces between the portable computer and the docking station are prevented. A release button is pressed to make the hooks separate from the holes when the portable computer is removed from the docking station.

However, a continuance of the pressure on the release button applied by a hand of a user is unavoidable before the portable computer is entirely removed from the docking station by another hand of the user. Obviously, the user cannot withdraw the hand pressing the release button while another hand holding the portable computer during the divorce between the portable computer from the docking station. Therefore, great inconvenience is generated.

Therefore, a locking device for a docking station with a higher convenience is desired.

SUMMARY OF THE INVENTION

A locking device includes a case defining at least one slot therein, a hook module including at least one hook for passing through the at least one slot, a linkage module includes at least one first lever configured for shifting the at least one hook to move between a locking position and a releasing position, and a positioning module for releasably engaging with the first lever. When the at least one hook is shifted to the releasing position, the first lever is blocked by the positioning module, when the at least one hook is shifted to the locking position, the first lever is released by the positioning module.

Other advantages and novel features will become more apparent from the following detailed description of preferred embodiments when taken in conjunction with the accompanying drawings, in which:

DETAILED DESCRIPTION OF THE INVENTION

In the following embodiment, a locking device for a docking station is used as an example for illustration. It is noted that docking station in the embodiment may be used for portable computers, cell phones, power chargers, or any other portable electronic apparatuses.

Figure 1:
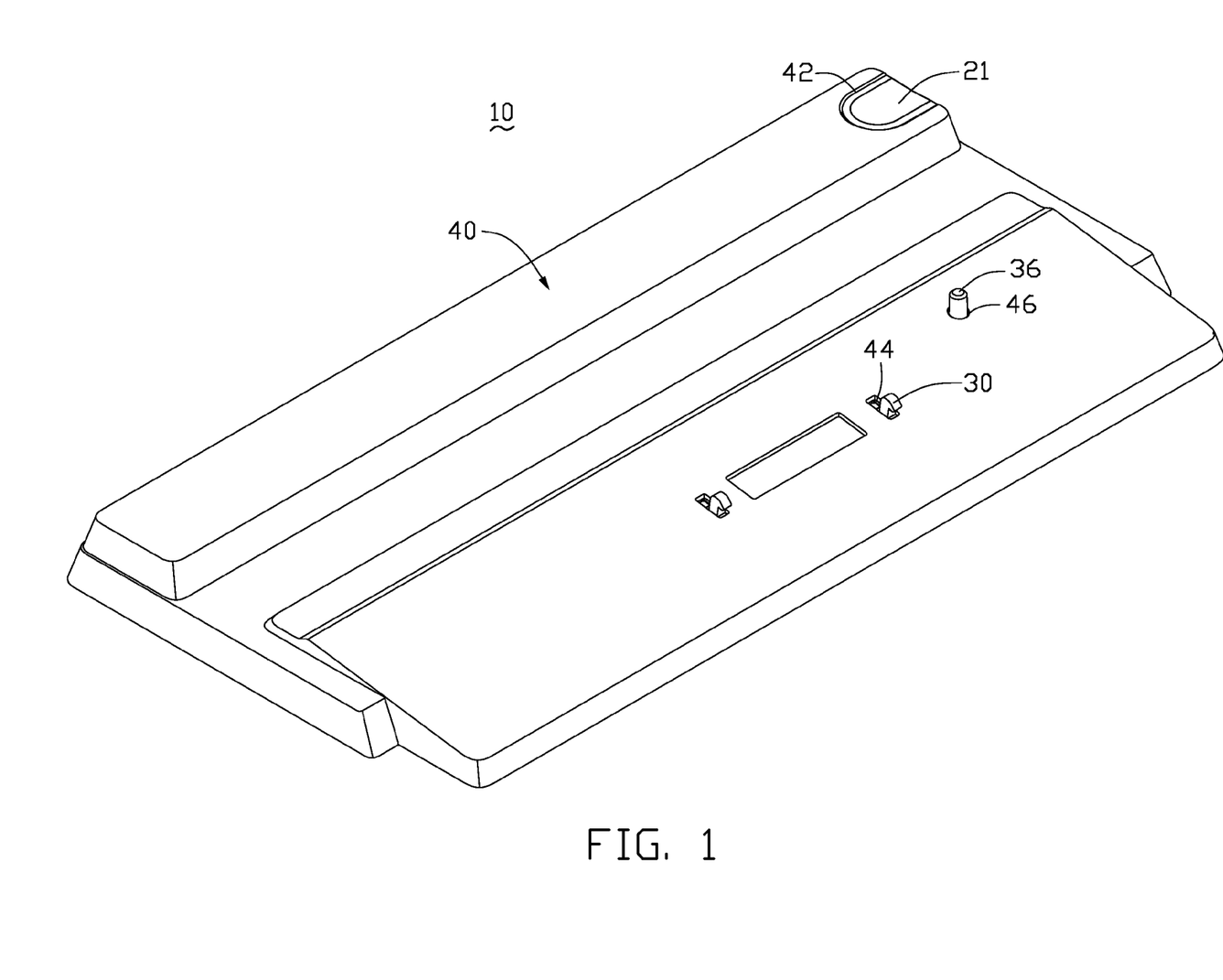
FIG. 1 is an isometric view of a locking device for a docking station in accordance with an exemplary embodiment.
Figure 2:
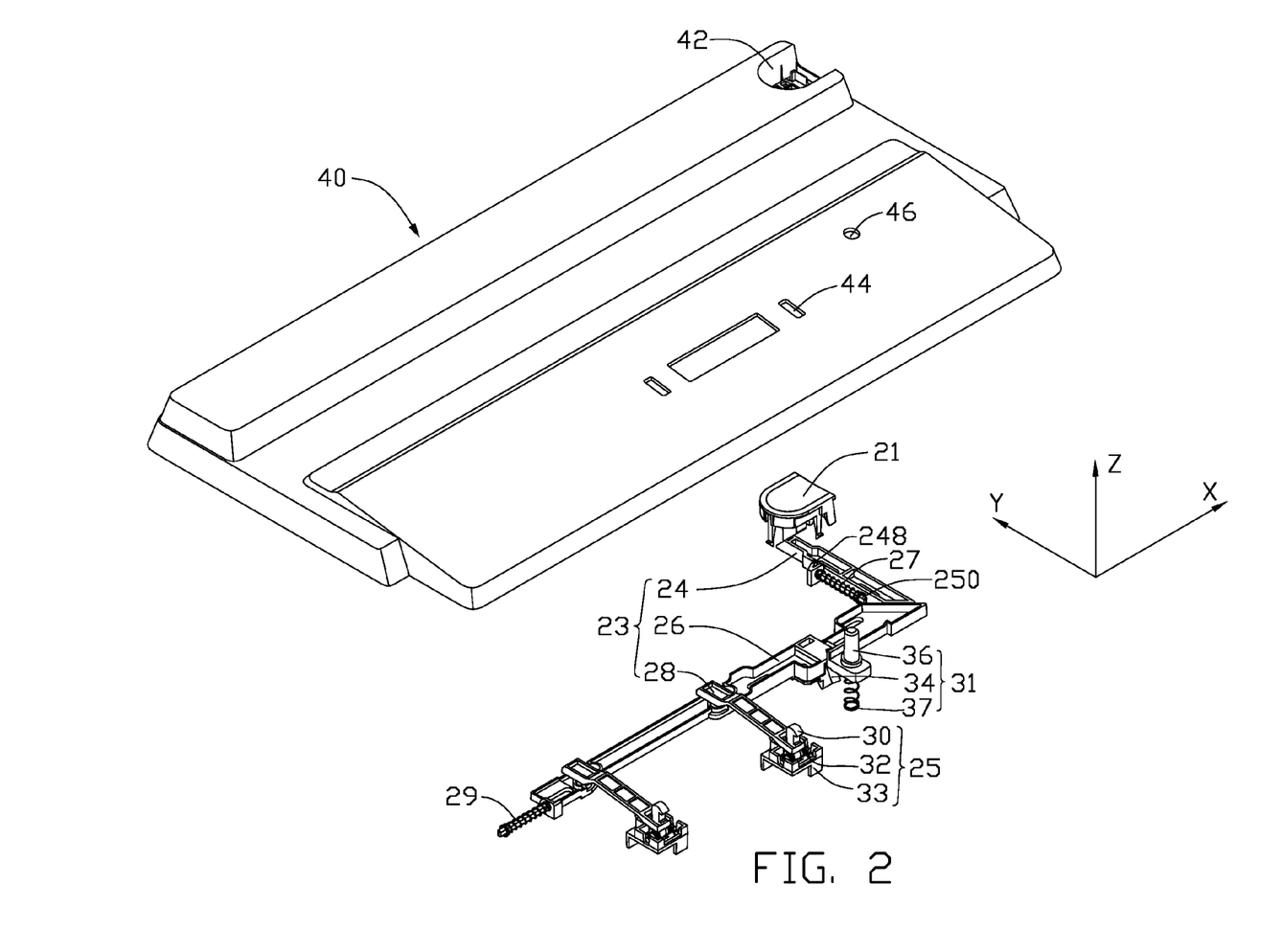
FIG. 2 is an exploded, isometric view of the locking device of FIG. 1.
Figure 3:
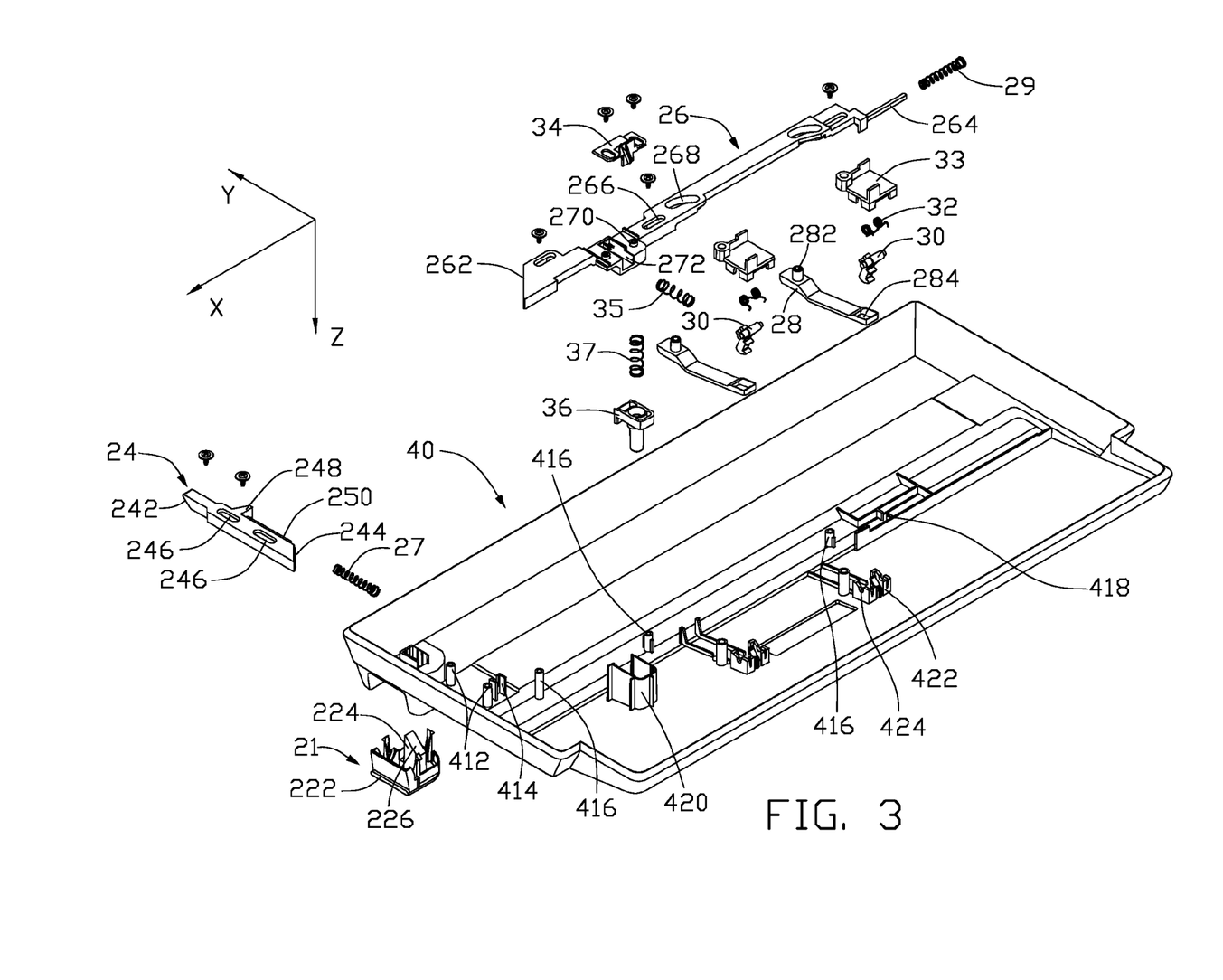
FIG. 3 is another exploded, isometric view of the locking device of FIG. 1.

Referring to FIGS. 1 to 3, a locking device 10 according to an exemplary embodiment is illustrated. The locking device 10 includes a release button 21, a linkage module 23, two hook modules 25, a first spring 27, a second spring 29, a positioning module 31 and a case 40.

The release button 21 is capable of moving along a first direction Z, and includes a cap 222 capable of receiving pressure, a pressing post 224 with a first inclined surface 226, and a plurality of clasps 228. The pressing post 224 perpendicularly extends from a center of the cap 222 for transmitting the pressure to the linkage module 23. The first inclined surface 226 is formed at a free end of the pressing post 224 opposite to the cap 222 for engaging with the linkage module 23. The clasps 228 perpendicularly extend from a periphery of the cap 222 for slidably engaging with the case 40.

The linkage module 23 includes a first lever 24, a second lever 26, and a pair of third levers 28. The first lever 24 and the pair of third levers 28 are spaced from each other. The first lever 24 is substantially perpendicular to the second lever 26 and parallel to the pair of third levers 28. The pair of third levers 28 and the first lever 24 are arranged at two opposite sides of the second lever 26.

The first lever 24 is movable long a second direction Y, and includes a second inclined surface 242 for engaging with the first inclined surface 226 of the release button 21, a third inclined surface 244 for engaging with the second lever 26, a protrusion 248 extending from the first lever 24 along a direction opposite of a third direction X, a first guiding rod 250 extending from the protrusion 248 along a direction reversed to the second direction Y for the first spring 27 to be sleeved/engaged therearound. The second inclined surface 242 and the third inclined surface 244 are formed at two opposite ends of the first lever 24. Two first guiding slots 246 are defined in the first lever 24 and extend along the second direction Y.

Figure 4:
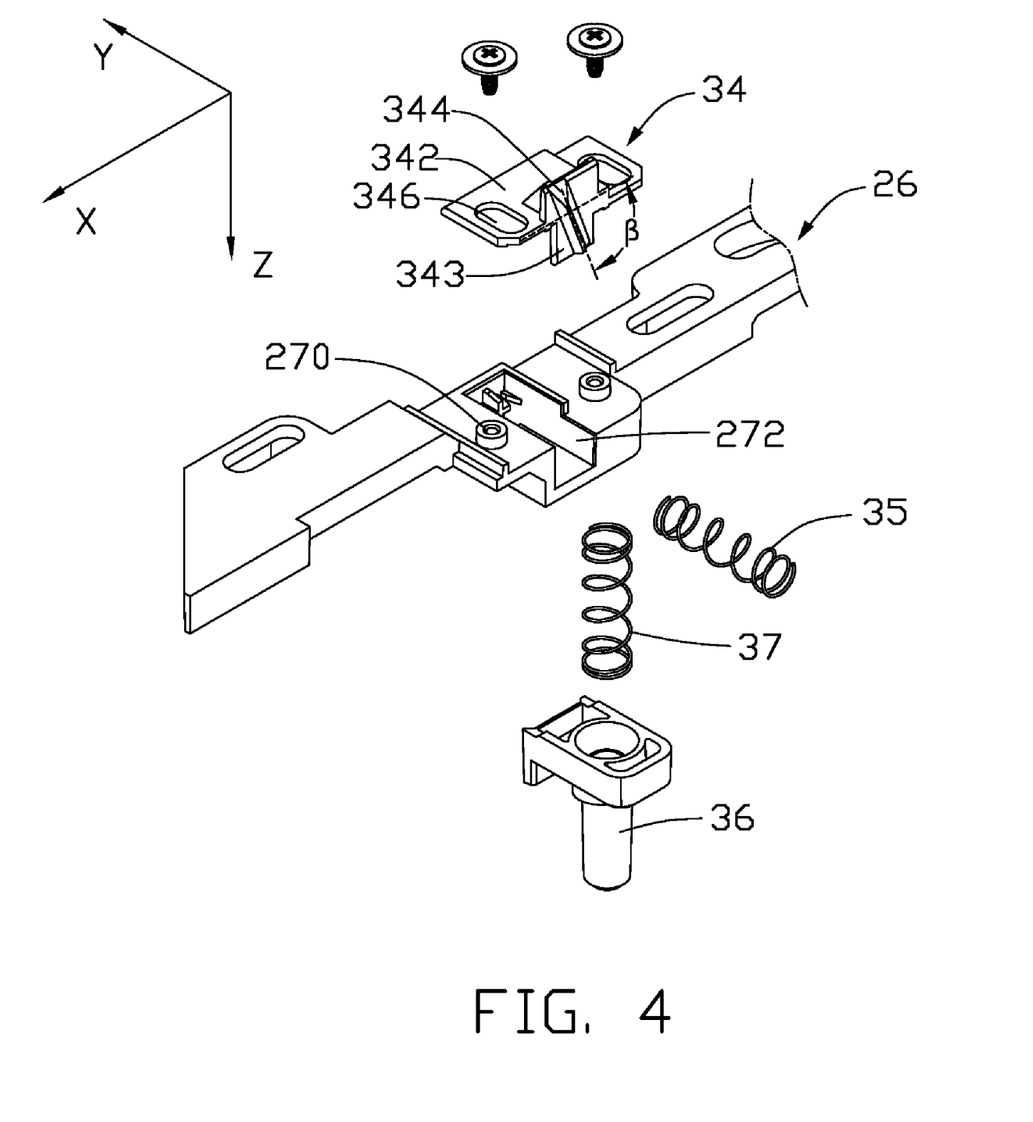
FIG. 4 is an exploded, enlarged, isometric view of a positioning module of the locking device of FIG. 3.
Figure 5:
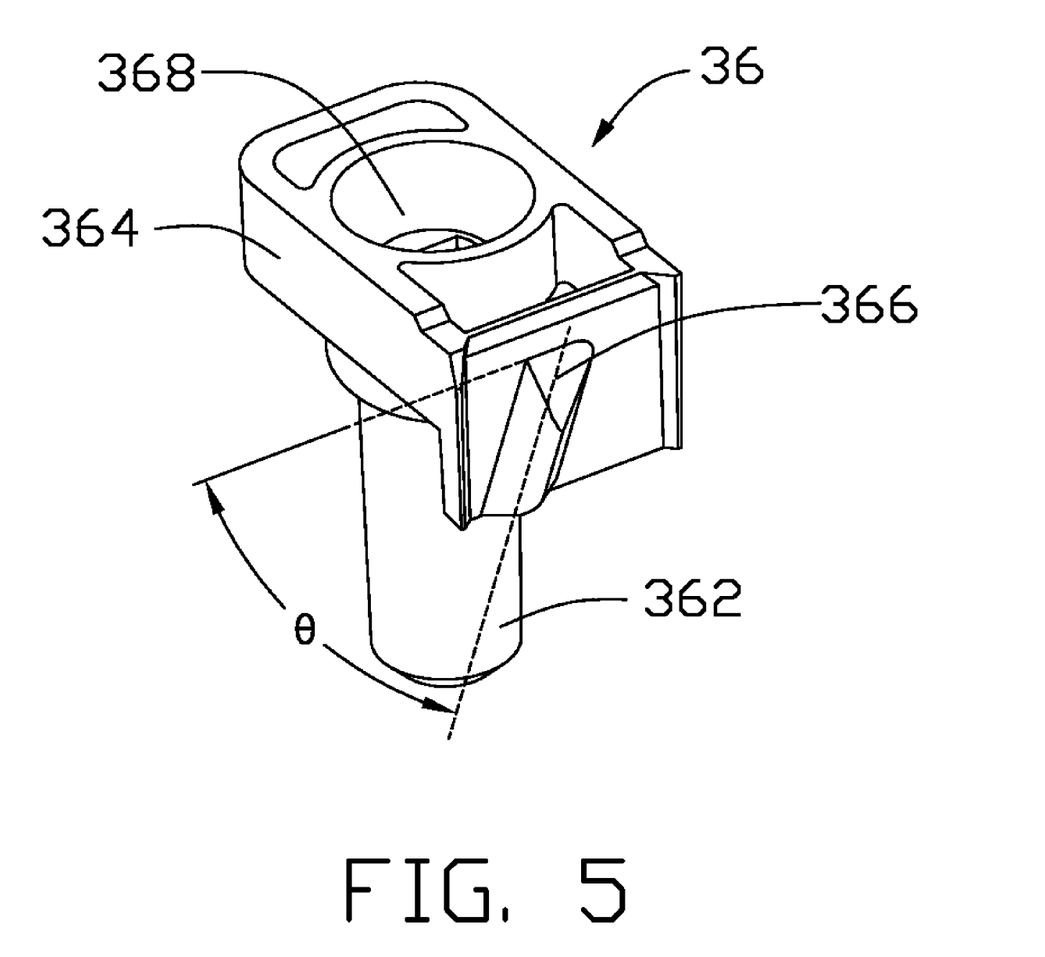
FIG. 5 is an exploded, enlarged, isometric view of a positioning module of FIG. 3.

Referring also to FIGS. 4 and 5, the second lever 26 is movable along the third direction X, and includes a fourth inclined surface 262 for engaging with the third inclined surface 244 of the first lever 24, a second guiding rod 264 extending from a distal end of the second lever 26 opposite to the fourth inclined surface 262 for the second spring 29 sleeving therearound, and a pair of first mounting posts 270 for slidably mounting a first positioning portion 34. A second concave 272 is defined on the second lever 26 for receiving a third spring 35. Three second guiding slots 266 are defined in the second lever 26, and extend along the third direction X. Two traction slots 268 are cam-like and are defined on the second lever 26 for guiding movements of the pair of third levers 28.

The positioning module 31 includes the first positioning portion 34, the third spring 35, a second positioning portion 36, and a fourth spring 37. The first positioning portion 34 is substantially T-shaped, and includes a first plate 342, a second plate 343 perpendicularly attached to an edge of the first plate 342, and a first rack 344 positioned on the second plate 342 for engaging with the second positioning portion 36. A first angle β is defined between an elongated direction of the first rack 344 and the first plate 342. The first angle β is greater that 0 degrees and less than 90 degrees. A pair of third guiding slots 346 are defined on the two opposite sides of the first plate 342, for the first mounting posts 270 to be slidably engaged in. The third spring 35 is accommodated in the second concave 272, and interconnects an inner side of the second concave 272 and the first positioning portion 34. The second positioning portion 36 includes a detecting pin 362 for detecting whether a portable computer 50 (shown in FIG. 7) is loaded, a base 364 for supporting the detecting pin 362, and a second rack 366 arranged at a sidewall of the base 364 for engaging with the first rack 344. A second angle θ is defined between an elongated direction of the second rack 366 and the base 364. The second angle θ is equal to the first angle β. That is, the second rack 366 conforms to the first rack 344. When the first rack 344 engages the second rack 366, two component forces are generated along the first direction Z and the third direction X respectively. A third concave 368 is defined on the base 364 opposite to the detecting pin 362, for accommodating the fourth spring 37.

Figure 6:
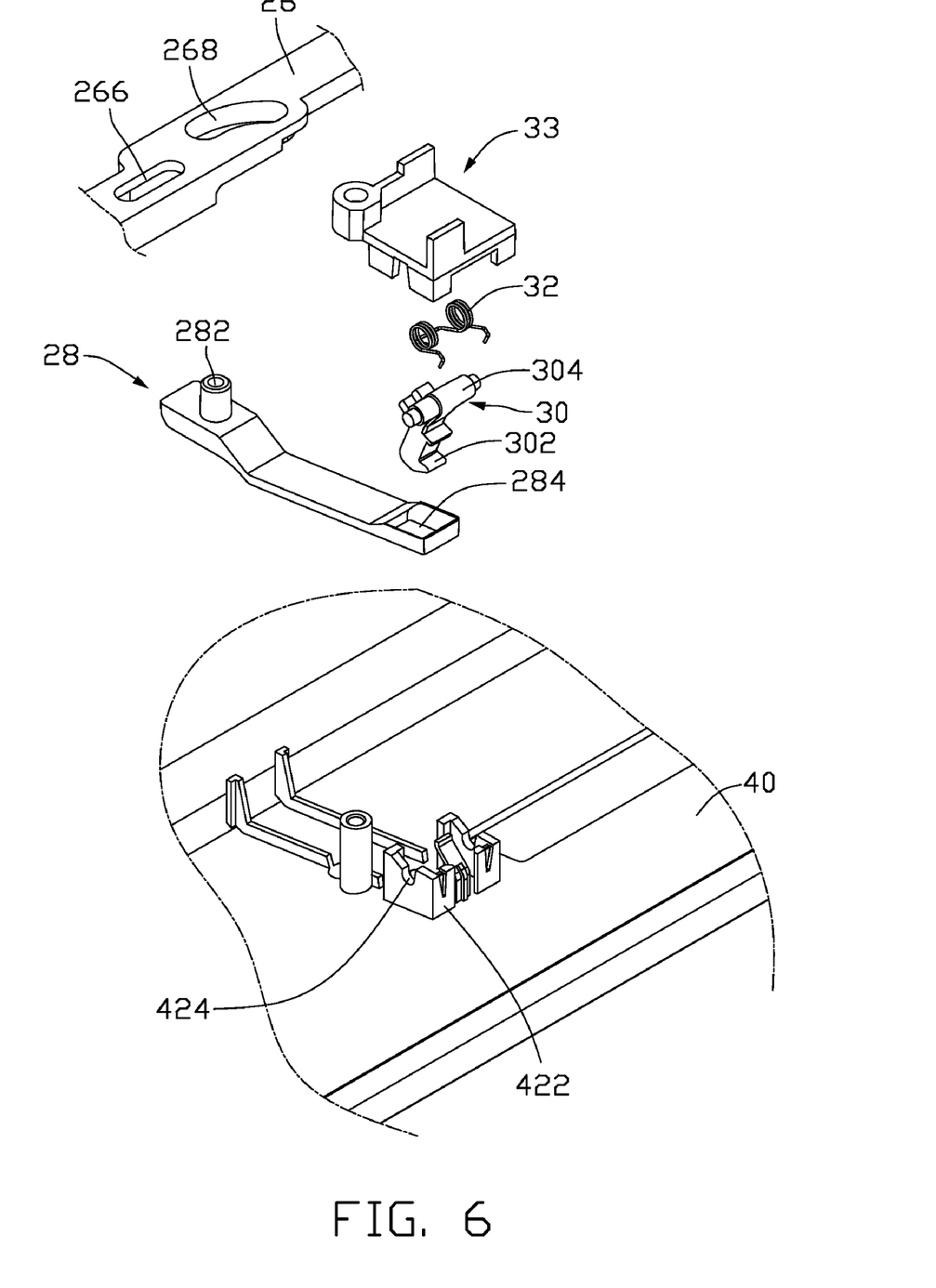
FIG. 6 is an isometric view of a detecting pin of the positioning module of FIG. 3.

Referring also to FIG. 6, each of the pair of third levers 28 includes a sliding pin 282 perpendicularly extending from one end of the third lever 28 for engaging in the traction slot 268. A retaining ring 284 is defined in an opposite end of the third lever 28 for engaging with the hook module 25. Each hook module 25 includes a hook 30, a torsion spring 32, and a mounting cover 33. The hook 30 includes a hook end 302, and an opposite pivot end 304 for the hook end 302 to rotate around. The hook end 302 extends through the retaining ring 284. The mounting cover 33 secures the hook 30 onto an inner side of the case 40.

Referring back to FIGS. 1 and 2, the case 40 defines a first concave 42 for receiving the release button 21, two inserting slots 44 for the corresponding hook end 302 of the hook module 25 to be inserted through correspondingly, a through hole 46 for the detecting pin 362 of the second positioning portion 36 inserting therethrough.

Referring back to FIG. 3, the case 40, viewed from its inner side, includes two second mounting posts 412, a first blocking sheet 414, three third mounting posts 416, a second blocking sheet 418, a positioning base 420, and two mounting base 422 corresponding to the mounting covers 33. The two second mounting posts 412 are arranged along the second direction Y for engaging in the first guiding slots 246 correspondingly. The first blocking sheet 414 supports a free end of the first guiding rod 250, and blocks the first spring 27 between the protrusion 248 of the first lever 24 and the first blocking sheet 414. The three third mounting posts 416 are arranged along the third direction X for engaging in the second guiding slots 266 correspondingly. A second blocking sheet 418 supports a free end of the second guiding rod 264, and blocks the second spring 29 between the end of the second lever 26 and the second blocking sheet 418. The positioning base 420 is substantially U-shaped for enclosing the second positioning portion 36. Each mounting base 422 defines two bearing portions 424 for rotatably supporting the pivot end 304 of the hook 30, and is capable of being covered by the mounting cover 33. The torsion spring 32 interconnects the hook 30 and the mounting base 422 for applying a torsion force to the hook 30 to drive the hook end 302 to rotate away from the second lever 26.

Figure 7:
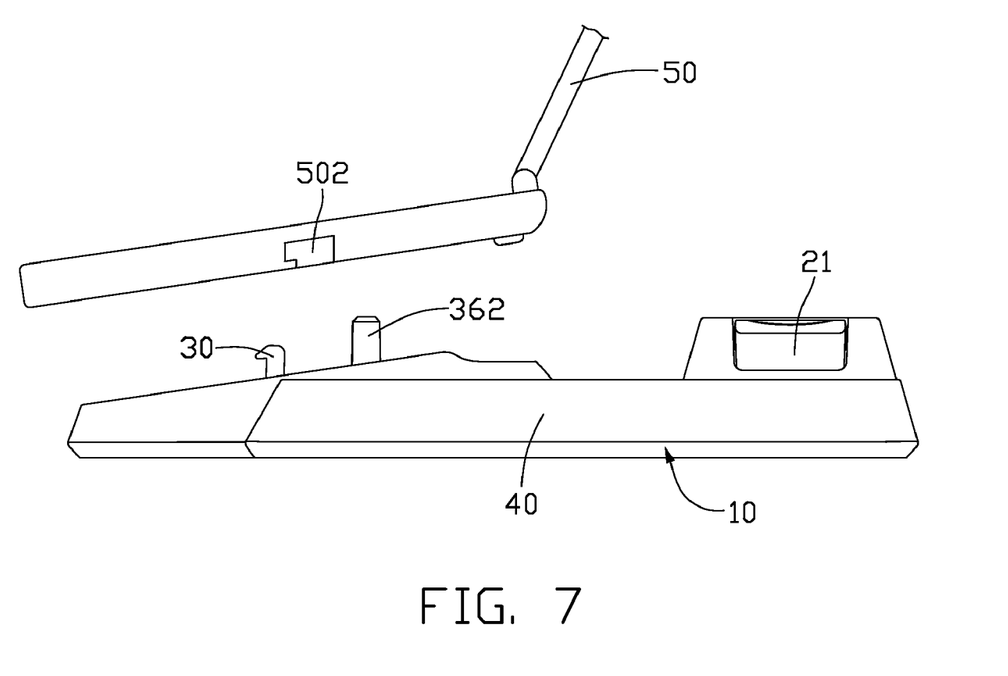
FIG. 7 is a side view of a portable computer and a docking station of FIG. 1.
Figure 8:
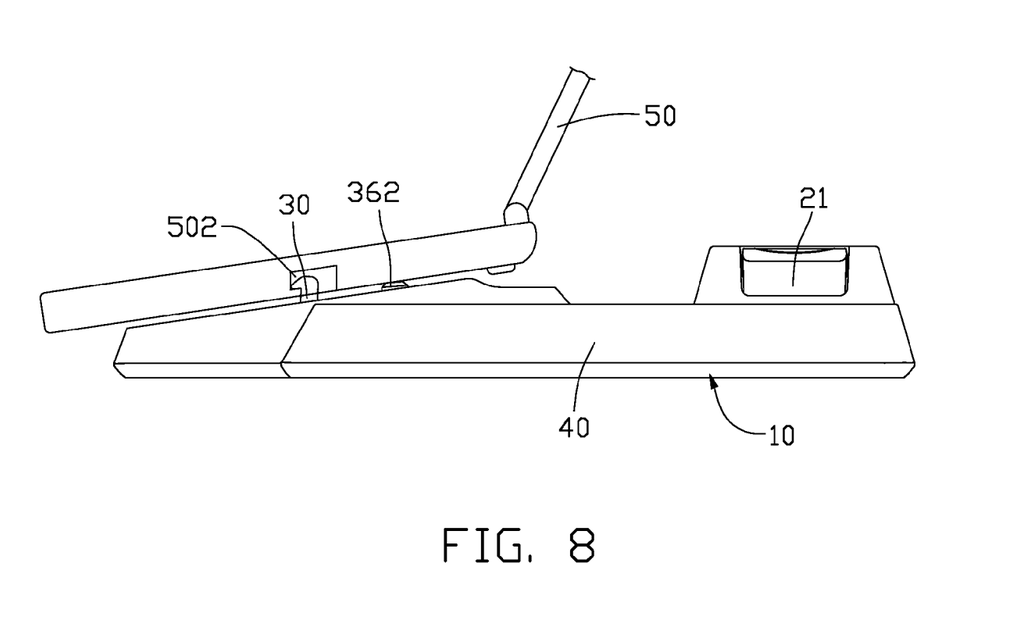
FIG. 8 is a side view of the portable computer incorporating the docking station of FIG. 1.

Referring also to FIGS. 7 and 8, an assembly of a portable computer 50 and the locking device 10 is illustrated. The portable computer 50 defines two hook holes 502 at its bottom. Each of the hook holes 502 conforms to the corresponding hook 30 and is defined as an L-shape for the hook 30 to engage in. Before the portable computer 50 is loaded onto the locking device 10, the detecting pin 362 of the second positioning portion 36 is at a released state, and most of the detecting pin 362 extends out from the case 40. When the portable computer 50 is placed on the case 40, the detecting pin 362 is pressed to move along a direction contrary to the first direction Z, and retracts into the case 40. The hook ends 302 of the hooks 30 are rotated to insert into the hook holes 502 by pressures applied via corresponding edges of the hook holes 502. The portable computer 50 can thus be locked to the case 40 by the hooks 30. During this time, the first rack 344 of the first positioning portion 34 and the second rack 366 of the second positioning portion 36 continuously separate from each other, and the linkage module 23 stays at its original position.

When a removal of the portable computer 50 is desired, the release button 21 is pressed along the direction contrary to the first direction Z. The first inclined surface 226 of the pressing post 224 is driven to press the second inclined surface 242 of the first lever 24. The first lever 24 is thus driven to move along the direction contrary to the second direction Y due to a guidance of the two first posts 412. At the same time, the first spring 27 is compressed to store potential energy. The third inclined surface 244 of the first lever 24 presses the fourth inclined surface 262 of the second lever 26. The second lever 26 is thus driven to move along the direction contrary to the third direction X due to a guidance of the three second posts 416. At the same time, the second spring 29 is compressed to store potential energy. The third levers 28 are driven to move along the second direction Y because of engagements between the sliding pins 282 and the traction slots 268. The hooks 30 are thus driven to rotate about their own pivot ends 304 to so as to allow the hook holes 502 to be blocked because torsion provided by the torsion springs 32 is balanced by the third levers 28. The first rack 344 of the first positioning portion 34 is blocked by the second rack 366 of the second positioning portion 36 before the detecting pin 362 returns to the released state. The hand (not shown) actuating the release button 21 can be released when the portable computer 50 is removed from the case 40.

Figure 9A:
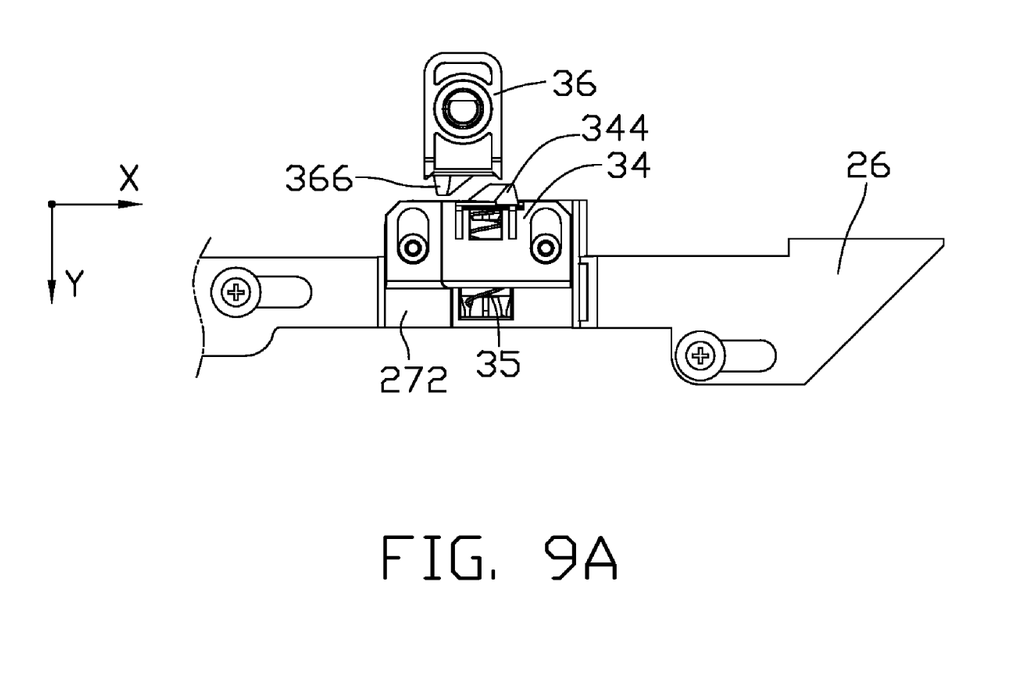
FIGS. 9A to 9C are bottom views of the positioning module of FIG. 3, showing relative movements of a positioning portion and a detecting portion.
Figure 9B:
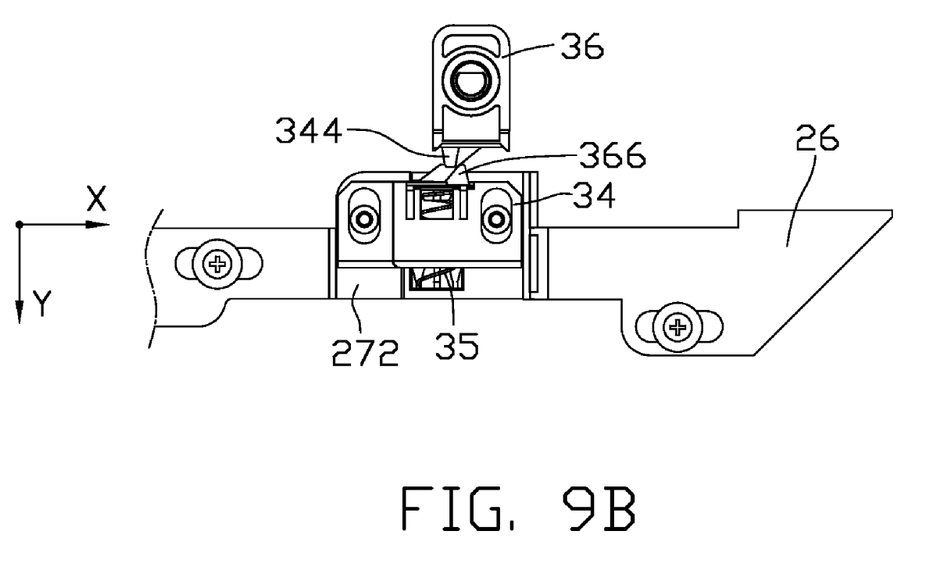
Figure 9C:
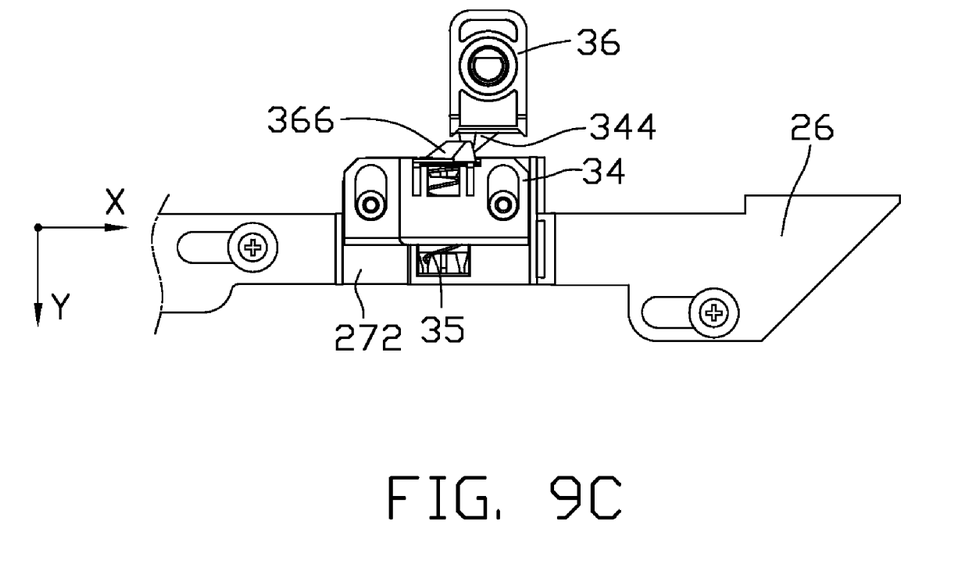

Referring back to FIGS. 4, 5, and also to FIGS. 9A to 9C, detail description of the engagement of the second positioning portion 36 and the first positioning portion 34 is provided as follows. When the detecting pin 362 of the second positioning portion 36 is retracted into the case 40, the second rack 366 moves downwardly to align the first rack 344. When the second lever 26 is driven to move along the direction contrary to the third direction X, the first positioning portion 34 moves along with the second lever 26. When the first rack 344 is driven to contact the second rack 366, the third spring 35 is compressed to withdraw the first rack 344 into the second concave 272 in order to get out of the way for the second rack 366. After the first rack 344 passes over the second rack 366, the third spring is restored to urge the first rack 344 to move toward the second positioning portion 36. The first rack 344 is thus blocked by the second rack 366. The second lever 26 is capable of to continually pull the third levers 28 due to the interaction between the sliding posts 282 and the traction slots 268. The hook ends 302 are driven to release the hook holes 502 because of the pulling force transmitted by the third levers 28.

After the portable computer 50 is removed from the case 40, the fourth spring 37 is released and urges the second positioning portion 36 to move along the first direction Z. The second rack 366 separates from the first rack 344. The first positioning portion 34 is released. The second lever 26 is urged by the second spring 29 to move along the third direction X. The third levers 28 are thus released and moved along the direction contrary to the second direction Y. The hooks 30 are released, and are urged by the torsion springs 32 to reverse the hook ends 302. Finally, the locking device 10 returns to its original state.

Figure 10:
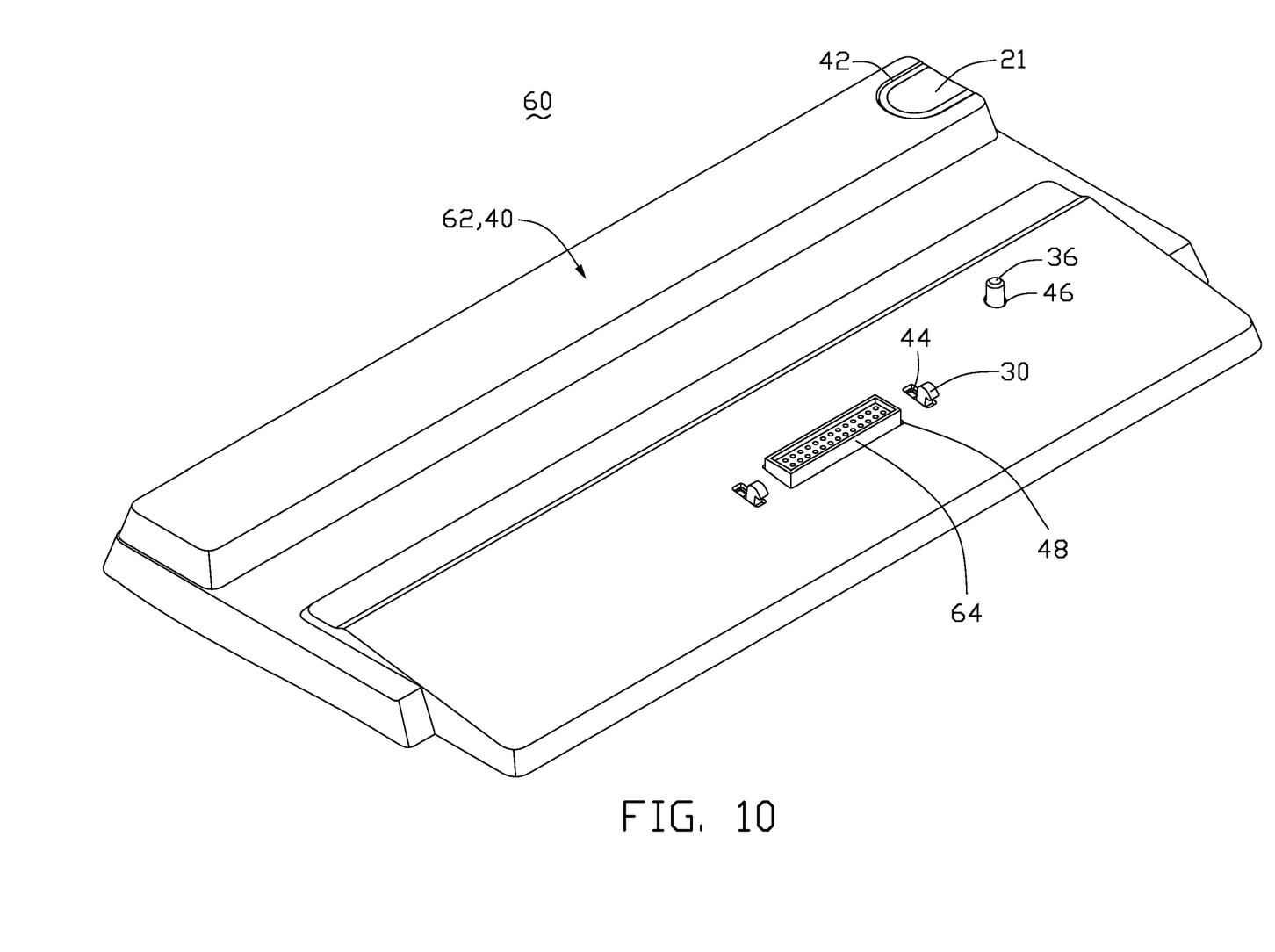
FIG. 10 is an isometric view of a docking station employing the locking device of the FIG. 1.

Referring also to FIG. 10, a docking station 60 employing the locking device 10 is illustrated. The case 40 of the locking device 10 is suitable for being used as a housing 62 of the docking station 60. The docking station 60 further includes a connector 64 that passes through an opening 48 defined on the case 40 for transmitting electrical signals.

In alternative embodiments, the first lever 24 may be omitted since the release button 21 may directly engage with the second lever 26. The release button 21 may also be positioned in a sidewall of the case 40 in a manner so as to actuate the second lever 26. The individual release button 21 may be replaced by constructing a handle that is integrated with the second lever 26. The pair of third levers 28 may be replaced by a structure such a pair of large-size slots defined in the second lever 26 that may be inserted through by the hook 30. Therefore, the hook 30 can be directly driven to rotate by the second lever 26. Fixing positions of the first positioning portion 34 and the second positioning portion 36 may be altered. That is, the first positioning portion 34 may be secured to the case 40 or the like, the second positioning portion 36 may be mounted to the second lever 26.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A locking device for releasably locking an electronic device, the locking device comprising:
   a case for attaching the electronic device thereto, the case defining at least one slot therein;
   a hook module comprising at least one hook configured for passing through the at least one slot;
   a linkage module comprising at least one first lever configured for shifting the at least one hook to move between a locking position and a releasing position; and
   a positioning module configured for releasably engaging with the first lever, wherein when the at least one hook is shifted by the first lever to the releasing position, the electronic device is unlocked from the case, the first lever is blocked by the positioning module for temporarily holding the hook at the releasing position before the electronic device is detached from the case, and when the electronic device is detached from the case, the first lever is released by the positioning module, and the at least one hook is shifted by the first lever to the locking position;
   wherein the positioning module comprises a first positioning portion configured for being slidable relative to the first lever, and a second positioning portion configured for detecting whether the electronic device is attached to or detached from the locking device, and selectively blocking the first positioning portion;
   wherein the first positioning portion comprises a first plate configured for slidably mounting to the first lever, a second plate attached to the first plate, and a first rack attached to the second plate, and a first angle is defined between an elongated direction of the first rack and the first plate.

2. The locking device as claimed in claim 1, further comprising a first spring interconnecting the first lever and the first positioning portion, and configured for urging the first positioning portion to engage with the second positioning portion.

3. The locking device as claimed in claim 2, wherein the first lever defines a first receiving portion configured for slidably receiving the first positioning portion therein.

4. The locking device as claimed in claim 1, wherein a pair of first guiding slots are defined in two opposite sides of the first plate, and are configured for a pair of corresponding mounting posts extending from the first lever to slidably engage therein.

5. The locking device as claimed in claim 1, wherein the second positioning portion comprises a base, a detecting pin substantially perpendicularly extending from the base and passing through a through hole defined in the case and configured for being retracted into the case substantially when a pressure is applied thereto, a second rack arranged at a sidewall of the base for detachably engaging with the first rack, and a second spring resiliently supporting the base and configured for urging the detecting pin to extend through the through hole, and a second angle is defined between an elongated direction of the second rack and the base, and the second angle is substantially equal to the first angle.

6. The locking device as claimed in claim 5, wherein the base is movable between a first position to make the second rack release the first rack, and a second position to make the second rack block the first rack.

7. The locking device as claimed in claim 6, wherein the linkage module further comprises at least one second lever interconnecting the at least one hook and the first lever and configured for being guided by the first lever to shift the hook to a release state.

8. The locking device as claimed in claim 7, wherein the second lever comprises at least one sliding pin configured for engaging in and being guided by at least one traction slot defined in the first lever, and a retaining portion arranged opposite to the sliding pin for engaging with the hook.

9. The locking device as claimed in claim 8, wherein the first lever comprises a first inclined portion and a first guiding rod, the first inclined portion and the first guiding rod are arranged at two opposite ends of the first lever, and a third spring engages around the first guiding rod and is configured for urging the first lever to release the hook.

10. The locking device as claimed in claim 9, further comprising a release button configured for driving the first lever, wherein the release button comprises a cap for a pressure applied thereon, and a pressing post with a second inclined portion formed for contacting the first inclined portion.

11. The locking device as claimed in claim 10, further comprising a third lever interconnecting the first lever and the release button, wherein the third lever comprises a main body, a third inclined portion for engaging with the second inclined portion, a fourth inclined portion for engaging with the first inclined portion, a second guiding rod extending from the main body, and a fourth spring engaging around the second guiding rod for urging the third lever to resume its original position.

12. The locking device as claimed in claim 11, wherein the third lever is parallel to the second lever and perpendicular to the first lever, and the third lever and the second lever are arranged at two opposite sides of the first lever.

13. The locking device as claimed in claim 1, wherein the case comprises a plurality of positioning posts for securing the linkage module.

14. A docking station for docking an electronic device, the docking station comprising:
 a housing defining at least one slot therein; and
 a locking device comprising:
  a hook module comprising at least one hook configured for passing through the at least one slot;
  a linkage module comprising at least one first lever configured for shifting the at least one hook to move between a locking position and a releasing position; and
 a positioning module configured for releasably engaging with the first lever, wherein when the at least one hook is in the releasing position, the positioning module is urged under weight of the electronic device to engage with the first lever, such that the first lever is blocked by the positioning module and the hook is temporarily held in the releasing position before the electronic device is removed from the docking station, and when the positioning module is released by the electronic device, the at least one hook is shifted to the locking position, and the first lever is released by the positioning module;
 wherein the positioning module comprises a first positioning portion configured for being slidable relative to the first lever, and a second positioning portion configured for detectably blocking the first positioning portion;
 wherein the first positioning portion comprises a first plate configured for slidably mounting to the first lever, a second plate attached to the first plate, and a first rack attached to the second plate, and a first angle is defined between an elongated direction of the first rack and the first plate.

15. The docking station as claimed in claim 14, wherein the second positioning portion comprises a base, a detecting pin substantially perpendicularly extending from the base and passing through a through hole defined in the case and configured for being retracted into the case substantially when a pressure is applied thereto, a second rack arranged at a sidewall of the base for detachably engaging with the first rack, and a second spring resiliently supporting the base and configured for urging the detecting pin to extend through the through hole, and a second angle is defined between an elongated direction of the second rack and the base, and the second angle is substantially equal to the first angle.

16. The docking station as claimed in claim 15, wherein the base is movable between a first position to make the second rack release the first rack, and a second position to make the second rack block the first rack.

* * * * *